(12) United States Patent
Rohde et al.

(10) Patent No.: US 11,482,098 B2
(45) Date of Patent: Oct. 25, 2022

(54) LOCALIZATION IN COMPLEX TRAFFIC SCENARIOS WITH THE AID OF MARKINGS

(71) Applicant: Robert Bosch GmbH, Stuttgart (DE)

(72) Inventors: Jan Rohde, Stuttgart (DE); Ruediger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 16/704,148

(22) Filed: Dec. 5, 2019

(65) Prior Publication Data

US 2020/0184816 A1    Jun. 11, 2020

(30) Foreign Application Priority Data

Dec. 6, 2018 (DE) .................. 102018221142.6

(51) Int. Cl.

| G08G 1/01 | (2006.01) |
|---|---|
| G08G 1/137 | (2006.01) |
| G08G 1/0967 | (2006.01) |
| G05D 1/02 | (2020.01) |
| G06V 20/56 | (2022.01) |
| G08G 1/0962 | (2006.01) |
| G06V 10/24 | (2022.01) |

(52) U.S. Cl.
CPC ......... *G08G 1/0116* (2013.01); *G05D 1/0234* (2013.01); *G05D 1/0274* (2013.01); *G06V 20/56* (2022.01); *G08G 1/096725* (2013.01); *G08G 1/096783* (2013.01); *G08G 1/137* (2013.01); *G06V 10/245* (2022.01); *G08G 1/09623* (2013.01)

(58) Field of Classification Search
CPC ................. G08G 1/0116; G08G 1/137; G08G 1/096783; G08G 1/096725; G08G 1/09623; G05D 1/0234; G05D 1/0274; G06K 9/00791; G06K 2009/3225; G06V 20/56; G06V 10/245
See application file for complete search history.

(56) References Cited

U.S. PATENT DOCUMENTS

| 4,854,768 | A | * | 8/1989 | Flanagan | ................ | E01F 9/571 |
|---|---|---|---|---|---|---|
| | | | | | | 404/11 |
| 5,525,883 | A | * | 6/1996 | Avitzour | .............. | G05D 1/0274 |
| | | | | | | 318/568.1 |
| 5,995,884 | A | * | 11/1999 | Allen | .................... | G05D 1/0225 |
| | | | | | | 701/24 |
| 6,205,380 | B1 | * | 3/2001 | Bauer | .................. | G05D 1/0274 |
| | | | | | | 180/169 |
| 6,453,223 | B1 | * | 9/2002 | Kelly | .................. | G05D 1/0246 |
| | | | | | | 318/587 |
| 7,437,226 | B2 | * | 10/2008 | Roh | ..................... | G05D 1/0234 |
| | | | | | | 701/25 |
| 7,845,560 | B2 | * | 12/2010 | Emanuel | ............... | B66F 9/0755 |
| | | | | | | 235/462.08 |

(Continued)

*Primary Examiner* — Dale W Hilgendorf
(74) *Attorney, Agent, or Firm* — Norton Rose Fulbright US LLP; Gerard Messina

(57) ABSTRACT

A method, which can be implemented by a control unit, for carrying out a localization of at least one vehicle by a vehicle-side control unit includes receiving measuring data from at least one sensor, ascertaining at least one marking from the measuring data, and associating the ascertained marking with a marking entered into a digital map for determining a position.

12 Claims, 2 Drawing Sheets

(56) References Cited

U.S. PATENT DOCUMENTS

| | | | |
|---|---|---|---|
| 8,210,435 B2* | 7/2012 | Mahan | G01S 5/163 |
| | | | 235/462.01 |
| 8,381,982 B2* | 2/2013 | Kunzig | G05D 1/0234 |
| | | | 235/462.08 |
| 8,565,913 B2* | 10/2013 | Emanuel | G06Q 10/087 |
| | | | 700/229 |
| 9,587,948 B2* | 3/2017 | Schuller | G05D 1/0274 |
| 10,696,240 B2* | 6/2020 | Gao | G06T 7/13 |
| 2008/0040029 A1 | 2/2008 | Breed | |
| 2010/0328054 A1* | 12/2010 | Yim | G01C 21/3602 |
| | | | 340/425.5 |
| 2012/0245832 A1* | 9/2012 | Meis | G06K 9/00818 |
| | | | 701/116 |
| 2016/0069985 A1* | 3/2016 | Kwakkernaat | G08G 1/04 |
| | | | 342/146 |
| 2017/0305013 A1* | 10/2017 | Freeman | G05D 1/0278 |
| 2018/0330172 A1* | 11/2018 | Lee | G05D 1/0246 |
| 2019/0064345 A1* | 2/2019 | Reed | G05D 1/0261 |
| 2019/0080612 A1* | 3/2019 | Weissman | G08G 1/164 |
| 2019/0160675 A1* | 5/2019 | Paschall, II | G05D 1/0274 |
| 2019/0265722 A1* | 8/2019 | Haeusler | G05D 1/0234 |
| 2019/0367012 A1* | 12/2019 | Matta | G06K 9/18 |
| 2020/0025575 A1* | 1/2020 | Weissman | G01S 13/751 |
| 2020/0103914 A1* | 4/2020 | Holz | G01C 21/32 |

\* cited by examiner

LOCALIZATION IN COMPLEX TRAFFIC SCENARIOS WITH THE AID OF MARKINGS

CROSS-REFERENCE TO RELATED APPLICATIONS

The present application claims priority under 35 U.S.C. § 119 to DE 10 2018 221 142.6 filed in the Federal Republic of Germany on Dec. 6, 2018, the content of which is hereby incorporated by reference herein in its entirety.

FIELD OF THE INVENTION

The present invention relates to a method for carrying out a localization of at least one vehicle by a vehicle-side control unit. The present invention furthermore relates to a marking and to a control unit.

BACKGROUND

Systems that use measuring data from sensors to carry out a localization based on a digital map are known. For example, GPS sensors are able to receive Global Navigation Satellite System (GNSS) signals from satellites and localize the GPS sensor within the digital map based on the received signals.

Disadvantages of the GNSS-based localization include a partially limited usability in urban areas and a susceptibility of the position determination to interferences.

Moreover, methods are known that extract location-specific countryside features or urban features from camera data and compare these to map data to carry out a localization. Such methods, however, require a high computing effort since the camera data are evaluated by complex algorithms.

SUMMARY

An object of the present invention is to provide a method and a marking that enable a highly precise and technically simple localization.

According to an aspect of the present invention, a method for carrying out a localization of at least one vehicle by a vehicle-side control unit includes receiving measuring data from at least one sensor, and ascertaining at least one marking by a control unit from the measuring data, for example, by an image evaluation or by extracting the marking from moving images. The measuring data can thus be designed in the form of images or moving images, for example.

Subsequently, the ascertained marking is associated with a marking entered into the digital map for determining a position. The at least one marking entered into the map is preferably designed as a virtual marking.

In safety-relevant areas of an infrastructure, GPS sensors may have insufficient accuracy and functional reliability. Although it is possible to define a position on a perimeter using the measuring data of a GPS sensor, the position cannot be determined precisely enough for automated or semi-automated driving tasks.

A comparison of the ascertained markings to the markings stored in the map can take place by the association or the identification of markings in the imprecise perimeter of the data of the GPS sensor. Based on the measuring data, a distance and a direction between the sensor or the control unit and the particular marking can be calculated for this purpose, whereby an exact localization is made possible. The step of associating can thus be used to link the at least one marking ascertained in the vehicle surroundings to a marking stored in the map or to assign the measuring data of the marking to the data of the map. In particular, in the case of multiple ascertained markings, it is also possible to detect a marking pattern, and link or associate it with a map-side marking pattern. The marking pattern can be formed by at least two markings and their geographical orientation with respect to one another.

According to an aspect of the present invention, in a system for carrying out a localization, at least one vehicle includes at least one sensor for ascertaining measuring data for detection of at least one marking that is situated in a safety-relevant or safety-critical area of an infrastructure and is ascertainable by the at least one sensor of the vehicle, the at least one marking being noted in a digital map at a corresponding position of the safety-relevant area.

According to an aspect of the present invention, a marking is provided, in particular, for carrying out a self-positioning by vehicles. The marking is situatable in a safety-relevant area of an infrastructure, the marking being simultaneously detectable by at least two different sensors of vehicles.

According to an aspect of the present invention, a control unit is configured to carry out the described method. The control unit can be connectable to at least one sensor and to at least one digital map in a data-conducting manner. The control unit can be configured to identify markings from measuring data of the sensor, and to assign the identified markings to a position on the digital map.

A precise self-localization of position sensors and road users in defined areas of the infrastructure can be ensured through the use of artificial markings in relevant or safety-relevant areas of the road traffic. In this way, in particular, the localization can be ensured in complex traffic situations, such as in the form of a redundancy of GPS sensors.

At least one marking can be used, in particular, in safety-relevant traffic areas, such as multi-lane circles or intersections, in which the GNSS-based position is not sufficiently precisely determinable by the position sensor, to increase the precision of the localization. In particular, all urban traffic areas can be considered to be safety-relevant. As an alternative or in addition, it is also possible for traffic areas outside cities to be classified at least area-by-area as being safety-relevant. This can include intersections, on-ramps, turnoffs, and the like. For a safe automated maneuvering, a positioning accuracy in an order of magnitude of ±10 cm should be provided for such safety-relevant traffic areas, which is achievable through the use of markings, in support of the GNSS-based positioning.

For example, a vehicle can detect the marking using sensors and measure the distance from the marking. One or multiple marking(s) can be detected and assigned to a position using a digital map, as a function of the arrangement of the markings in the particular area. It is also possible to use an arrangement or a pattern made up of multiple markings for determining the position within the map.

By measuring distances from different markings, it is possible, using the triangulation, for example, to calculate the position of the vehicle or of the sensor relative to the markings.

In this way, a highly precise and robust self-localization based on digital maps and special markings can be implemented.

The at least one marking can preferably be situated within an infrastructure in such a way that the marking is able to be detected simultaneously by all road users.

The marking can preferably be detectable in a sensor-independent and/or direction-independent manner. In this way, different sensors can recognize or unambiguously measure the at least one marking. The at least one marking can thus be used as a highly accurate reference point not dependent on sensor technology.

A high availability and reliability of the vehicle localization can be enabled through the use of such markings. The at least one vehicle can be a vehicle operable in an automated and/or semi-automated manner, which, in particular, is operable in a semi-automated, conditionally automated, highly automated, and/or fully automated or driverless manner according to the SAE J3016 standard.

As a result of the design of the markings, these can be detected using a plurality of different vehicle sensor systems, such as radar, video, and LIDAR. This results in an advantageous influence on the reusability of the markings and the use of detection algorithms with multiple vehicle systems. Furthermore, high detection rates can be achieved for the artificial markings in the local surroundings of the complex traffic situation through technology-independent detectability.

For example, the marking can have a design that is particularly easily extractable from measuring data of video sensors. For example, the marking can have a distinctive shape, such as a ball having a defined diameter. For example, the diameter can be 50 cm.

The marking can furthermore have a particularly efficiently reflective design for the use of radar sensors and/or LIDAR sensors. For this purpose, the marking can include a radar mirror or radar reflector and a beam reflector.

According to an example embodiment, the ascertained marking is compared to a digital map stored in the control unit or outside of the vehicle. As an alternative or in addition, the internally or externally stored digital map can be retrievable by the control unit. The map can also be stored in an external server unit or cloud in the process. The control unit can thus access measuring data from at least one sensor and evaluate the measuring data with respect to the markings.

According to an example embodiment, at least four markings are detected by the at least one sensor in at least one safety-relevant area. Depending on the design, one or two or also three markings can already be sufficient to carry out a precise localization by the control unit based on measuring data from at least one sensor.

The markings can preferably be ascertainable concurrently or simultaneously for each safety-relevant area. In this way, a robust three-dimensional position determination can be provided.

According to an example embodiment, the at least one marking is attachable in a position of the infrastructure, the position of the infrastructure being higher than vehicles of the infrastructure. The marking is detected simultaneously by at least two cross-vehicle sensors.

The at least one marking can particularly advantageously be positioned in an exposed position of the infrastructure. The marking can thus be installed in locations which are optimally scannable by sensors by preferably all road users.

For example, stop light poles, street light poles, and the like can be used for installing the markings within the infrastructure. The markings can preferably be detectable by conventional onboard sensors used by vehicles operable at least in a semi-automated manner. In particular, such a marking can be detected simultaneously by different sensors.

When multiple markings are used, the markings preferably have a defined distance from one another, so that a unique individual pattern made up of markings is generatable for each safety-relevant area. The respective distances between the markings can be used for differentiating the areas, for example.

According to an example embodiment, the at least one marking includes an active and/or a passive radar reflector(s). For example, the marking can include a triple mirror having a high effective cross section and a unique signature for radar sensors. The triple mirror can be shaped in a facet-like manner.

According to an example embodiment, the marking includes at least one light reflector. The light reflector can be configured as a cat's eye and thus have a high directionally independent reflectivity. Visible or invisible beams of LIDAR sensors can thus be effectively reflected, whereby the marking can be detected by LIDAR sensors.

According to an example embodiment, the marking has at least a geometric shape and/or a coating. The reflectivity and/or the visibility for camera sensors can be increased based on the coating. In particular, a high contrast with respect to surroundings can be created by the coating. The coating can be implemented in the form of a film or a paint. The shape of the marking can also contribute to an increased recognizability or identifiability of the marking. In particular, an individual recognizability of the marking can be caused based on the shape of the marking. The marking can thus be localized in the digital map in a technically simple manner. An unambiguous real position can be assigned to the sensor or the vehicle by localizing the at least one marking in the digital map.

In an advantageous variant, the marking can include at least one ball having a high contrast with respect to the surroundings. The marking can have a geometric shape or configuration that is precisely and unambiguously extractable from a photo or video by the control unit.

According to an example embodiment, the marking includes at least two partial markings, at least one partial marking being attachable on a roadway in the safety-relevant area. In this way, the marking can be divided into at least two partial markings. A radar reflector can thus be introduced into a roadway, for example, and a LIDAR reflector can be positioned on a stop light. In this way, the unambiguous identification can be simplified. Furthermore, the recognition of the partial markings by conventional sensors can thus be simplified.

The markings can thus be installed in such a way that they enable a minimum accuracy of the detection using arbitrary sensor technologies. The accuracy requirements can depend on the traffic situations to be expected. Markings can preferably be mounted in the infrastructure, so that they are not concealed to conventional vehicle-side sensors. The scanning areas or visible areas are taken into consideration in the arrangement of the markings in the infrastructure with the corresponding aperture angles and the range of the sensors.

Example embodiments of the present invention are described in greater detail hereafter based on highly simplified schematic representations.

DETAILED DESCRIPTION

Figure 1:
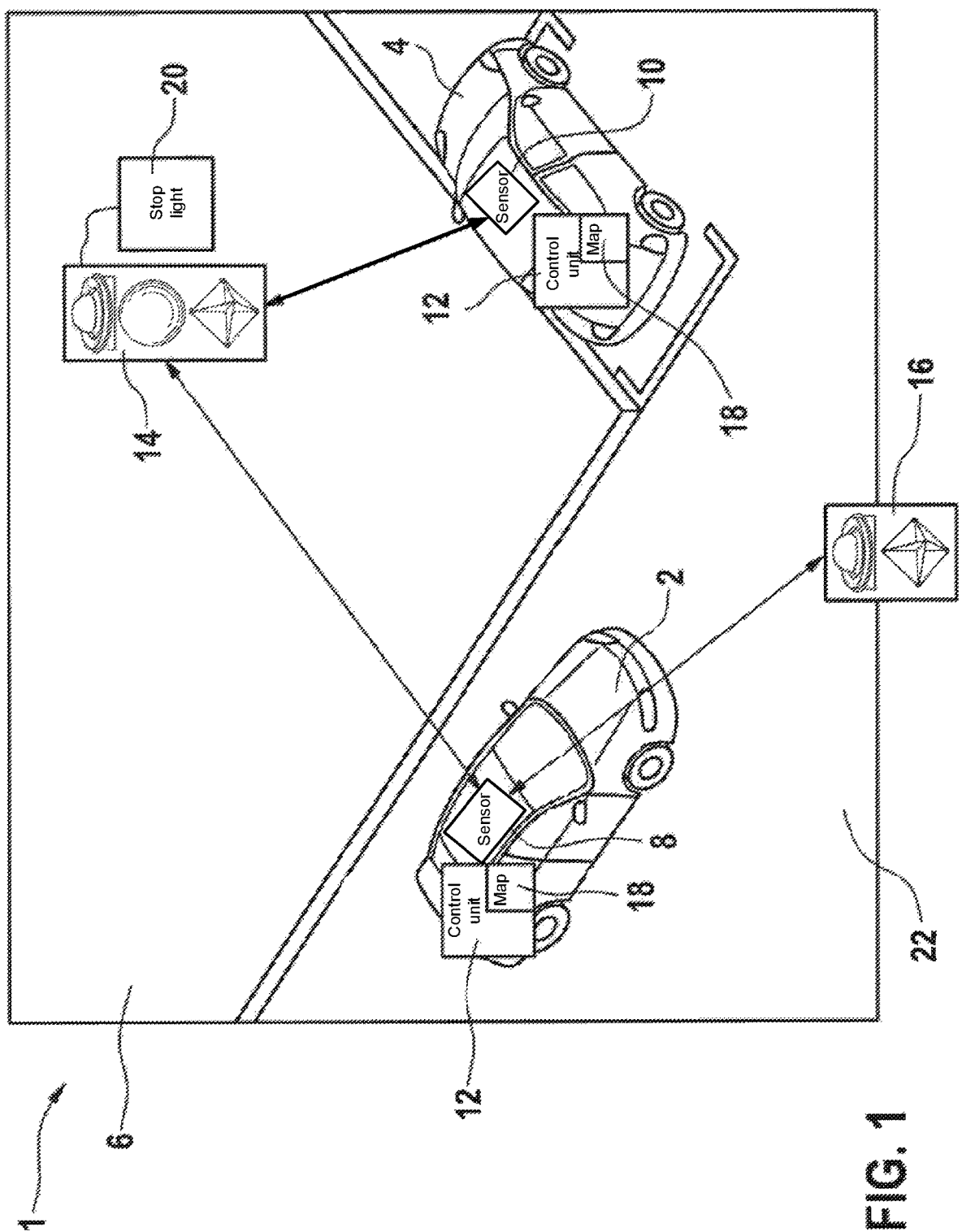
FIG. 1 shows a schematic representation of a system according to an example embodiment of the present invention.

FIG. 1 shows a system 1 according to an example embodiment. System 1 includes two vehicles 2, 4 traveling in an intersection. The intersection is a safety-relevant or safety-critical area 6 here, in which a precise localization of vehicles 2, 4 is to be ensured. The intersection serves only as an example embodiment of an urban traffic area for illustrating the method. The method can be applied to an arbitrary other city and/or to out-of-city traffic areas. A method according to an example embodiment can be illustrated with respect to system 1.

Vehicles 2, 4 include sensors 8, 10. First vehicle 2 includes a radar sensor 8. Second vehicle 4 is equipped with a LIDAR sensor 10. Sensors 8, 10 are each connected to a control unit 12 in a data-conducting manner. Control unit 12 can thus read out and evaluate the measuring data of sensors 8, 10. Control unit 12 can ascertain markings 14 and/or partial markings 16 from the measuring data.

Control unit 12 includes an integrated digital map 18. Map 18 includes all markings 14 and partial markings 16. The markings ascertained from the measuring data of sensors 8, 10 can thus be identified and localized by control unit 12 in digital map 18. An unambiguous position can thus be assigned to vehicles 2, 4 within safety-relevant area 6. This position is independent from GPS sensors and thus ascertainable in a robust manner.

According to the example embodiment, marking 14 is mounted on a stop light 20. Partial marking 16 is situated on a side of a roadway 22 and includes a radar reflector and a light reflector, which are described in greater detail in FIG. 2.

Figure 2:
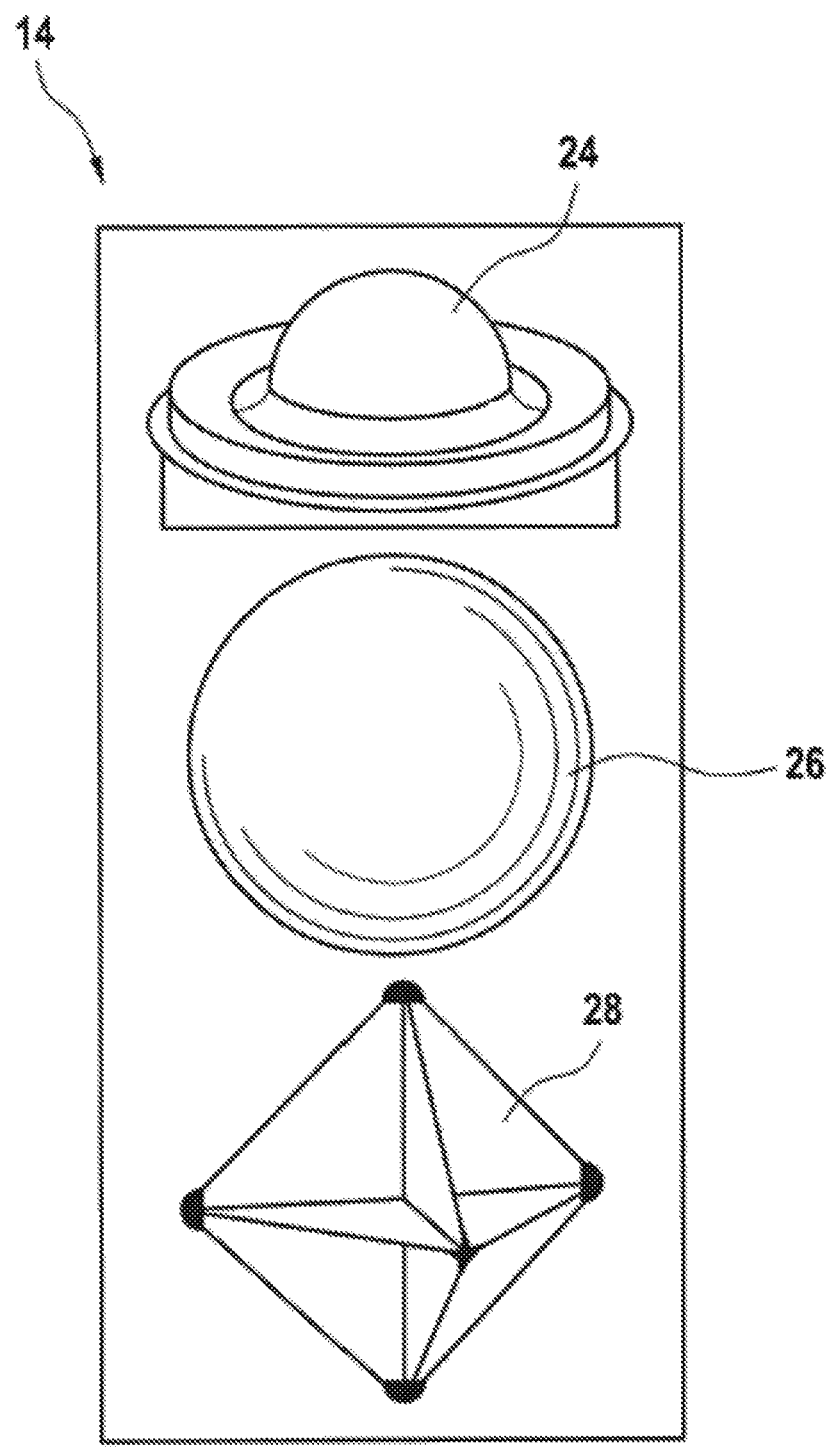
FIG. 2 shows a schematic representation of a marking according to an example embodiment of the present invention.

FIG. 2 shows a schematic top view onto a marking 14 according to an example embodiment. Marking 14 includes a 360° reflector 24 for visible and non-visible light. Reflector 24 can be implemented as a cat's eye or as a retroreflector and reflect incoming beams of a LIDAR sensor 10 back in the direction of the radiation source.

Marking 14 furthermore includes a ball 26 that has a high contrast with respect to safety-relevant area 6 and is thus optimally extractable from measuring data of camera sensors, which are not shown. Ball 26 represents a geometric shape with a defined coating that are optimally detectable by camera sensors.

Marking 14 includes a radar reflector 28 for marking 14 to be detectable by radar sensors 8. Radar reflector 28 is implemented as a passive radar reflector 28. In particular, radar reflector 28 is designed as a 360° triple mirror and can thus be detected by radar sensors 8 from different directions.

According to the example embodiment, the respective components 24, 26, 28 of marking 14 are situated in a row in a vertical direction and are mechanically connected to one another.

Marking 14 can be split into at least one partial marking 16 as a function of local circumstances. A partial marking 16 can include at least one of components 24, 26, 28.

Marking 14 and/or partial marking 16 can be positioned in different positions of area 6. Markings 14 and/or partial markings 16 can preferably be detectable by a maximum possible number of vehicles without restrictions.

What is claimed is:

1. A method for carrying out a localization of a vehicle, the method comprising:
at least one sensor of the vehicle outputting, towards each of two or more separate infrastructure structures that each includes a respective set of at least two reflectors, a respective sensor signal, at least one of which is a respective LIDAR signal, wherein each of the respective sets of the at least two reflectors includes:
a respective radar reflector; and
a respective LIDAR reflector that is shaped to produce signal reflections in different directions;
obtaining, by the at least one sensor, reflections of the output signals reflected from the two or more separate infrastructure structures;
performing, by a processor, a triangulation using the obtained reflections and based on respective directionalities indicated by the signal reflections of respective LIDAR reflectors;
associating, by the processor, the infrastructure structures, as represented by the triangulation, with one of a plurality of sets of markings that represent the infrastructure structures and that are in a digital map; and
determining a position of the vehicle based on the association with the one of the plurality of sets of markings;
wherein different ones of the plurality of sets of markings differ from one another with respect to respective marking distances of the respective sets, each of the marking distances being a respective distance separating the markings of a respective single one of the sets, the determination of the position of the vehicle being based on a determined correspondence of a recognized inter-marking distance detected based on the reflections to the marking distances.

2. The method of claim 1, wherein the associating includes comparing a relative position of the infrastructure structures indicated by the triangulation to positions of the markings in the digital map relative to each other, and wherein the digital map is stored in a control unit of the vehicle or outside of the vehicle.

3. The method of claim 1, wherein the triangulation is performed using reflections from at least four infrastructure structures.

4. The method of claim 1, wherein:
the at least two reflectors are attached to the infrastructure structures higher than the vehicle; and
the obtaining of the reflections is performed simultaneously by the vehicle and another vehicle.

5. The method of claim 1, wherein at least one of the radar reflectors is an active radar reflector.

6. The method of claim 1, wherein at least one of the reflectors has a geometric shape predefined in a control unit of the vehicle for recognizing in an image obtained by a camera.

7. The method of claim 1, wherein at least one of the sets of reflectors includes a camera-visible marking that has a coating.

8. The method of claim 1, wherein at least one of the infrastructure structures is another region of the roadway or another roadway.

9. The method of claim 1, wherein at least one of the radar reflectors is a passive radar reflector.

10. The method of claim 1, wherein at least one of the radar reflectors is a 360° triple mirror.

11. The method of claim 1, wherein each of the respective radar reflectors has a unique signature with which a radar sensor of the vehicle is able to uniquely associate reflected radar signals with the respective radar reflectors.

12. The method of claim 1, wherein the LIDAR reflector is a cat's eye reflector arranged above a roadway on a pole.

* * * * *